United States Patent
Baehrle-Miller et al.

(10) Patent No.: US 8,930,110 B2
(45) Date of Patent: Jan. 6, 2015

(54) AUTOMATIC PARKING BRAKE WITH OPTIMIZED RE-TENSIONING METHOD

(71) Applicant: Robert Bosch GmbH, Stuttgart (DE)

(72) Inventors: Frank Baehrle-Miller, Schoenaich (DE); Dieter Blattert, Kirchheim/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/165,742

(22) Filed: Jan. 28, 2014

(65) Prior Publication Data
US 2014/0214296 A1 Jul. 31, 2014

(30) Foreign Application Priority Data
Jan. 29, 2013 (DE) .................. 10 2013 201 403

(51) Int. Cl.
*G06F 7/70* (2006.01)
*B60T 11/04* (2006.01)
*B60T 13/74* (2006.01)

(52) U.S. Cl.
CPC ............. *B60T 11/046* (2013.01); *B60T 13/746* (2013.01)
USPC ....................................................... 701/70

(58) Field of Classification Search
None
See application file for complete search history.

(56) References Cited

U.S. PATENT DOCUMENTS 7,652,560 B2 * 1/2010 Ohmura et al. ............... 340/436
2007/0241870 A1 * 10/2007 Ohmura et al. ............... 340/435

* cited by examiner

*Primary Examiner* — Thomas Tarcza
*Assistant Examiner* — Adam Alharbi
(74) *Attorney, Agent, or Firm* — Maginot, Moore & Beck LLP

(57) ABSTRACT

A method for re-tensioning an automatic parking brake by an electric motor includes carrying out a re-tensioning process after a predefined time period after the tensioning of the parking brake. The parking brake is driven in the tensioning direction by the electric motor to determine the travel carried out by the parking brake in the tensioning direction and the clamping force exerted by the parking brake during the re-tensioning. The method further includes carrying out a further re-tensioning process after a predefined time if the travel of the parking brake is less than a predefined threshold value and the clamping force in the parking brake is less than a second threshold value. If the travel of the parking brake is greater than a third threshold value or the clamping force exerted by the parking brake is greater than a fourth threshold value, a further re-tensioning process is not carried out.

10 Claims, 2 Drawing Sheets

AUTOMATIC PARKING BRAKE WITH OPTIMIZED RE-TENSIONING METHOD

This application claims priority under 35 U.S.C. §119 to patent application no. DE 10 2013 201 403.1 filed on Jan. 29, 2013 in Germany, the disclosure of which is incorporated herein by reference in its entirety.

BACKGROUND

The disclosure relates to a method for re-tensioning an automatic parking brake by means of an electric motor, to a control device having a re-tensioning algorithm, and to an automatic parking brake for vehicles having a special re-tensioning method.

Automatic parking brakes (APB) usually comprise an operator control element such as, for example, a pushbutton key with which the parking brake can be locked or released. When the operator control element is activated, a control device connected thereto detects the parking brake request and actuates an actuator element such as, for example, an electric motor correspondingly in order to build up braking force at the parking brake or to release the brake.

A wide variety of different parking brake systems are known from the prior art, which also include systems in which the electric motors (with transmissions) are located directly on the wheel brakes. This design is also referred to as "motor on caliper".

Conventional parking brakes are usually re-tensioned after a predefined waiting time. This is due to the fact, in particular, that after the stationary state of the vehicle the parking brake cools and the individual mechanical components of the parking brake shrink slightly as a result. A loss of clamping force can occur owing to such thermal relaxation. In order to continue to ensure the functional capability of the parking brake, it must be re-tensioned from time to time. For this purpose, the electric motor of the parking brake is actuated again by the parking brake control device a predefined time after the vehicle has been shut down, and the parking brake mechanism is driven automatically in the tensioning direction until the desired clamping force is restored. The re-tensioning of the parking brake is generally repeated several times. With this method, it is, on the one hand, disadvantageous that the parking brake system has to be operational for a relatively long time. On the other hand, the electric on-board power system and the individual components of the parking brake are loaded to a relatively large extent.

The object of the present disclosure is therefore to provide a method for re-tensioning a parking brake which is actuated by electric motor and to provide a parking brake system in which the re-tensioning process can be carried out significantly more efficiently.

SUMMARY

This object is achieved by a method for re-tensioning an automatic parking brake by means of an electric motor having the features of the disclosure and by an automatic parking brake for vehicles having a special re-tensioning method having the features of the disclosure. Further embodiments of the disclosure can be found in the dependent claims.

According to the disclosure, a method for re-tensioning an automatic parking brake by means of an electric motor is proposed in which the electric motor is actuated again a predefined time after the initial tensioning of the parking brake, in order to re-tension the parking brake. During the re-tensioning process, the parking brake mechanism is driven in the tensioning direction, wherein the travel carried out by the parking brake mechanism in the tensioning direction and the clamping force exerted by the parking brake are determined. According to the disclosure, a further re-tensioning process is not carried out if the travel carried out by the parking brake mechanism during the re-tensioning is greater than a predefined threshold value or an initial clamping force is greater than a predefined second threshold value. This is due essentially to the following considerations: a large adjustment travel during the re-tensioning of the parking brake implies that the wheel brakes must have been relatively hot before the (initial) tensioning of the parking brake and have subsequently cooled to a correspondingly large extent, as a result of which a loss of clamping force has occurred owing to thermal relaxation. On the other hand, a high initial clamping force during the re-tensioning of the parking brake either implies that the wheel brakes must have been relatively cold before the tensioning of the parking brake and have subsequently cooled only by a small extent, as a result of which only a small amount of thermal relaxation has occurred, or that the parking brake has been tensioned with very high initial pressure, with the result that despite the small amount of relaxation at the end a sufficiently high clamping force still remains. Therefore, the clamping force increases relatively quickly during the re-tensioning and reaches high values. In both cases, a further subsequent re-tensioning process is not necessary and is therefore not carried out either according to the disclosure.

If the travel carried out by the parking brake mechanism during the re-tensioning is, on the other hand, less than a third threshold value and the initial clamping force is also less than a fourth threshold value, an undefined or faulty state is present. In this case, it is appropriate to carry out a further re-tensioning process. According to the disclosure, a further re-tensioning process is therefore carried out after a predefined time.

The first and third threshold value can basically be the same or of different magnitudes, as can the second and the fourth threshold value.

If the first re-tensioning process is not intended to be followed by a further re-tensioning process, the parking brake system, in particular the electric motor and/or the parking brake control device, is preferably placed in a standby mode or switched off entirely.

The travel carried out by the parking brake mechanism can be, for example, that travel which is carried out by a brake caliper driven by the electric motor or a nut which is seated on a spindle which is driven in rotation by the electric motor, a rotational speed of a shaft driven in rotation by the electric motor or of a spindle, or a variable which is proportional thereto.

The first threshold value for the travel carried out by the parking brake mechanism can be, for example, 0.08 mm. However, depending on the embodiment of the parking brake, the threshold value can also be larger or smaller.

The second threshold value for the clamping force of the parking brake can be, for example, 13 kN. Depending on the configuration, the second threshold value can, however, also be larger or smaller.

According to one specific embodiment of the disclosure, the first and/or further re-tensioning process is carried out only by means of the electric motor. That is to say, the parking brake is tensioned solely by means of the electric motor, in particular without support by the hydraulic brake system.

According to another embodiment of the disclosure, the first and/or further re-tensioning process is carried out both using the electric motor and by means of the hydraulic brake system. In this case, the forces exerted by the electric motor and by the hydraulic brake system are added to give a resulting clamping force. The hydraulic component of the clamping force can be exerted, for example, by means of a hydraulic pump or by the driver by activating the foot brake pedal.

According to one preferred embodiment of the disclosure, the first and/or further re-tensioning process is carried out until the parking brake mechanism has carried out a predefined travel and/or the clamping force has reached a predefined value and is then preferably aborted. If at least one condition is met, it is possible to assume that the parking brake is tensioned to a sufficiently large extent.

According to the disclosure, control electronics are also proposed which can actuate the electric motor and carry out one or more re-tensioning processes as has been described above. For this purpose, in particular a corresponding software algorithm is provided in the control electronics.

The disclosure also relates to an automatic parking brake for vehicles having an operator control element for activating the parking brake and an electric motor for driving at least one brake lining in a tensioning direction or release direction. The automatic parking brake according to the disclosure also comprises control electronics for carrying out a re-tensioning process, in which the parking brake mechanism is driven in the tensioning direction by means of an electric motor; a sensor system for determining the travel carried out by the parking brake mechanism in the tensioning direction and the clamping force exerted by the parking brake during the re-tensioning, wherein the control electronics do not carry out a further re-tensioning process if the travel carried out by the parking brake mechanism during the re-tensioning is greater than a predefined threshold value or an initial clamping force during the re-tensioning is greater than a predefined second threshold value. If, on the other hand, the travel carried out by the parking brake mechanism during the re-tensioning is less than a third threshold value and also the initial clamping force is less than a fourth threshold value, according to the disclosure the control electronics carry out a further re-tensioning process after a predefined time.

BRIEF DESCRIPTION OF THE DRAWINGS

The disclosure will be explained in more detail below by way of example with reference to the appended drawings, in which.

DETAILED DESCRIPTION

Figure 1:
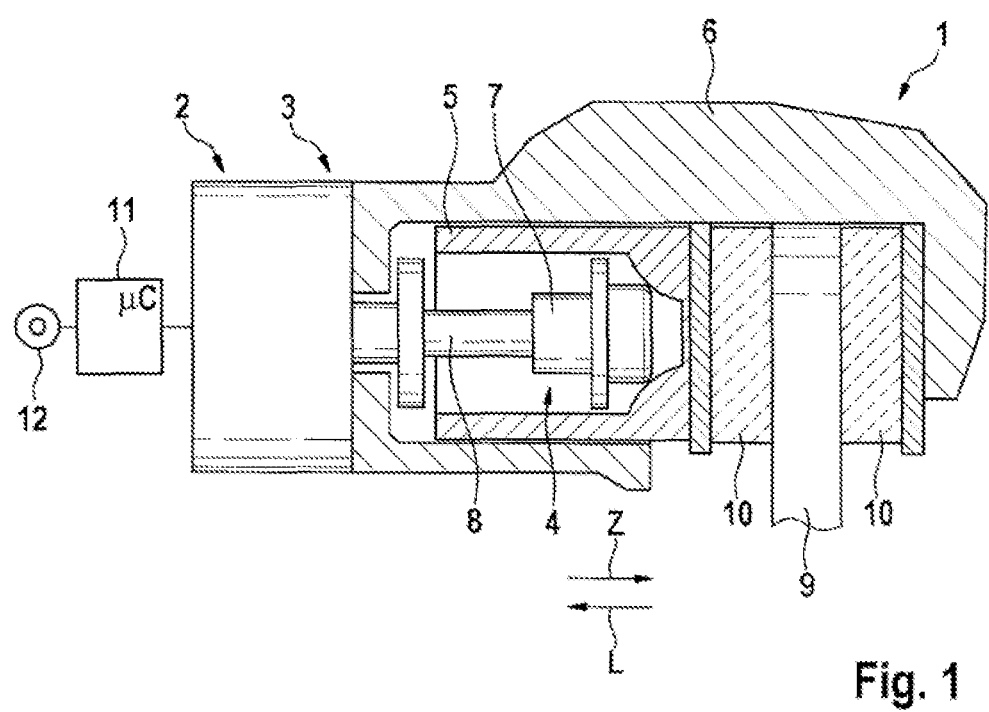
FIG. 1 is a schematic illustration of an electromechanical parking brake according to one embodiment of the disclosure.

FIG. 1 shows an electromechanical parking brake 1 for securing a vehicle in the stationary state. The parking brake 1 comprises a brake caliper assembly 6 which engages around a brake disk 9 in the form of a brake caliper. An electric motor 2, which drives a parking brake mechanism 4, is attached to the brake caliper assembly 6. The brake which is illustrated in FIG. 1 serves simultaneously as a hydraulic service brake as well as a parking brake for securing a vehicle in the stationary state.

The parking brake mechanism 4 comprises a spindle 8 which is driven in rotation by the electric motor 2 via a step-down transmission 3. A component which is embodied as a spindle nut 7 is arranged in a rotationally fixed fashion on the threaded spindle 8, said component moving axially during a rotation of the threaded spindle 8, either in the tensioning direction Z or in the release direction L of the brake. The threaded spindle 8 and the spindle nut 7 are arranged here within a brake piston 5 on whose side facing the brake disk 9 a brake lining carrier and a brake lining 10 are mounted. A further brake lining 10, which is attached to the brake caliper 6, is located on the opposite side of the brake disk 9.

In order to tension the parking brake 1, the electric motor 2 is operated in such a way that the spindle nut 7 is moved in the tensioning direction Z, with the result that it presses against the floor of the brake piston 5 and drives it in the tensioning direction Z. The tensioning of the parking brake can be supported by the hydraulic brake system, wherein the resulting clamping force is then composed of an electromotive component and a hydraulic component. The hydraulic brake pressure can be built up, for example, automatically by means of a hydraulic pump; however, it can also be generated by the driver by activating the foot brake pedal.

The parking brake illustrated in FIG. 1 is activated by means of an operator control element 12 such as, for example, a pushbutton key. If the pushbutton key 12 is pressed, a control device 11 connected thereto detects the parking brake request of the driver and actuates the electric motor 2 correspondingly in order to tension or release the parking brake 1. In the case of a tensioning request, the electric motor 2 drives the parking brake mechanism 4 in the tensioning direction Z until a desired tensioning force is reached. The level of the tensioning force can be estimated, for example, in a known fashion from the motor current. After the desired tensioning force is reached, the electric motor 2 is switched off. Since the parking brake mechanism 4 is of self-locking design, the parking brake 1 remains in this state in a stable fashion and the vehicle is secured without expending energy.

Figure 2:
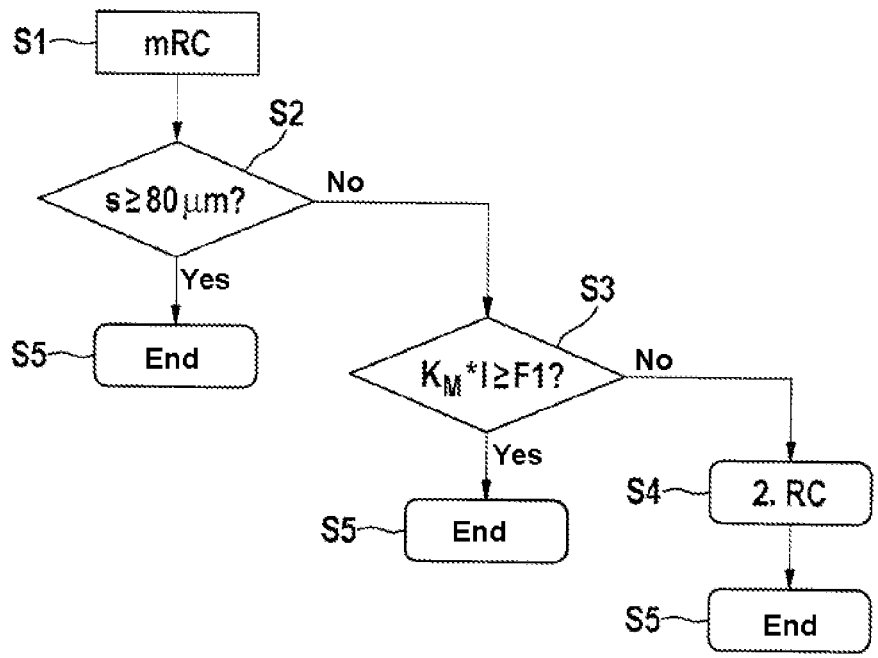
FIG. 2 shows various method steps of a method for re-tensioning an automatic parking brake according to a first embodiment of the disclosure.

FIG. 2 shows various method steps during the re-tensioning of an automatic parking brake according to a first embodiment of the disclosure. In this embodiment, a re-tensioning process is carried out a predefined time after the initial tensioning of the parking brake (which has taken place, for example, in reaction to an activation of the pushbutton key 12) in step S1, during which the parking brake mechanism 4 is driven in the tensioning direction Z by means of the electric motor 2. In this context, it is determined in step S2 whether the travel s carried out by the parking brake mechanism 4 is greater than a predefined first threshold value such as, for example, 80 μm. If the travel s is greater than or equal to 80 μm, the method ends in step S5. Otherwise, it is checked in step S3 whether the clamping force exerted by the parking brake is greater than or equal to a predefined second threshold value such as, for example, F1. If this condition is met (yes), the method again ends. If the condition in step S3 is, on the other hand, not met (no), in step S4 a further re-tensioning process is carried out. The further re-tensioning process can either be carried out immediately or after a predefined time of greater than zero. After step S4, the method ends with step S5. The further re-tensioning process in step S4 is carried out here exclusively by means of the electric motor 2.

Figure 3:
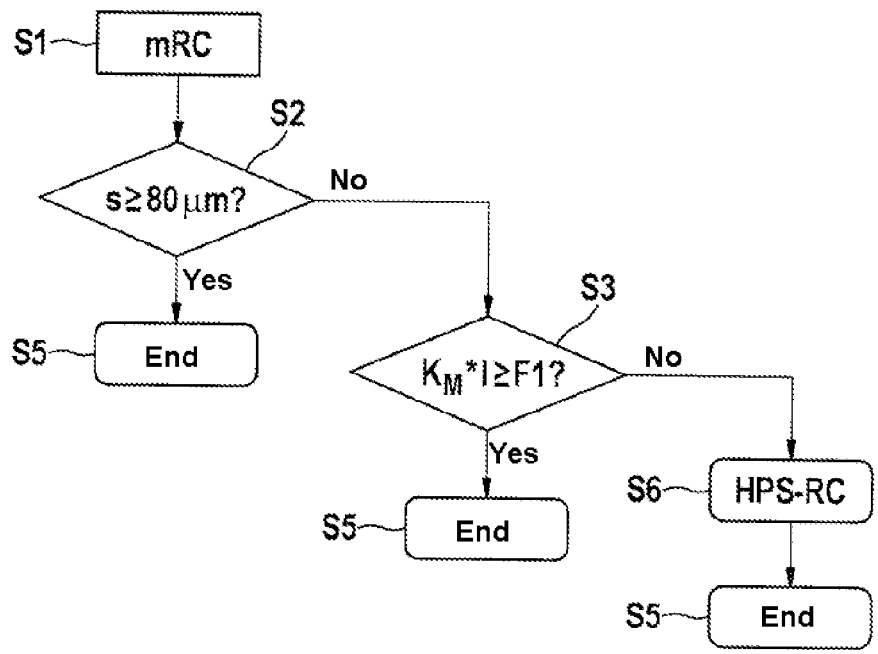
FIG. 3 shows various method steps of a method for re-tensioning an automatic parking brake according to a second embodiment of the disclosure.

FIG. 3 shows various method steps of a method for re-tensioning an automatic parking brake according to a second embodiment of the disclosure. The method steps S1 to S3 are identical here to the corresponding steps in FIG. 2. If both the travel s carried out by the brake lining 10 of the parking brake 1 is less than the associated first threshold value and the clamping force exerted by the parking brake 1 is less than the associated second threshold value F1, a further re-tensioning process is carried out in step S6. However, in contrast to the embodiment in FIG. 2, this re-tensioning process takes place using both the electric motor 2 and the hydraulic brake system. As a result, it is ensured in all cases that the parking brake 1 is tensioned with a sufficiently high clamping force.

What is claimed is:

1. A method for re-tensioning an automatic parking brake by an electric motor, comprising:
   starting a re-tensioning process at a predefined time after the tensioning of the parking brake, the electric motor being configured to drive a parking brake mechanism in the tensioning direction;
   determining the travel carried out by the parking brake mechanism in the tensioning direction and the clamping force exerted by the parking brake during the re-tensioning; and
   not carrying out a further re-tensioning process if the travel carried out by the parking brake mechanism during the re-tensioning is greater than a first threshold value or the clamping force exerted by the parking brake in an initial phase of the re-tensioning process is greater than a second threshold value, or
   carrying out a further re-tensioning process after a predefined time if the travel carried out by the parking brake mechanism during the re-tensioning is less than a third threshold value and the initial clamping force of the parking brake is less than a fourth threshold value.

2. The method according to claim 1, wherein one or more of the first threshold value and the third threshold value for the travel carried out by the parking brake mechanism is between 50 μm and 150 μm.

3. The method according to claim 2, wherein the second threshold value or the fourth threshold value for the clamping force exerted by the parking brake is between 8 kN and 18 kN.

4. The method according to claim 1, wherein the further re-tensioning process is carried out only by the electric motor.

5. The method according to claim 1, wherein the further re-tensioning process is carried out using the electric motor and the hydraulic brake system.

6. The method according to claim 1, wherein a re-tensioning process is carried out until one or more of the parking brake mechanism has carried out a predefined travel and the clamping force has reached a predefined value.

7. A control device configured to carry out a method for re-tensioning an automatic parking brake by an electric motor, the method comprising:
   starting a re-tensioning process after a predefined time after the tensioning of the parking brake, the electric motor being configured to drive a parking brake mechanism in the tensioning direction;
   determining the travel carried out by the parking brake mechanism in the tensioning direction and the clamping force exerted by the parking brake during the re-tensioning; and
   not carrying out a further re-tensioning process if the travel carried out by the parking brake mechanism during the re-tensioning is greater than a first threshold value or the clamping force exerted by the parking brake in an initial phase of the re-tensioning process is greater than a second threshold value, or
   carrying out a further re-tensioning process after a predefined time if the travel carried out by the parking brake mechanism during the re-tensioning is less than a third threshold value and the initial clamping force of the parking brake is less than a fourth threshold value.

8. An automatic parking brake for a vehicle, comprising:
   an operator control element configured to activate the parking brake;
   an electric motor configured to drive at least one brake lining in a tensioning direction or a release direction; and
   a control device configured to carry out a re-tensioning process including driving a parking brake mechanism in the tensioning direction by the electric motor, the control device being further configured to:
      determine the travel carried out by the parking brake mechanism in the tensioning direction and the clamping force exerted by the parking brake during the re-tensioning; and
      not carry out a further re-tensioning process if the travel carried out by the parking brake mechanism during the re-tensioning is greater than a first threshold value or the clamping force exerted by the parking brake in an initial phase of the re-tensioning process is greater than a second threshold value, or
      carry out a further re-tensioning process after a predefined time if the travel carried out by the parking brake mechanism during the re-tensioning is less than a third threshold value and the initial clamping force of the parking brake is less than a fourth threshold value.

9. The method according to claim 2, wherein one or more of the first threshold value and the third threshold value for the travel carried out by the parking brake mechanism is approximately 80 μm.

10. The method according to claim 3, wherein the second threshold value or the fourth threshold value for the clamping force exerted by the parking brake is approximately 13 kN.

* * * * *